Aug. 30, 1960  S. D. BARCLAY  2,951,031
PROCESS FOR PURIFYING OIL WITH MONOISOPROPANOLAMINE
Filed May 7, 1958
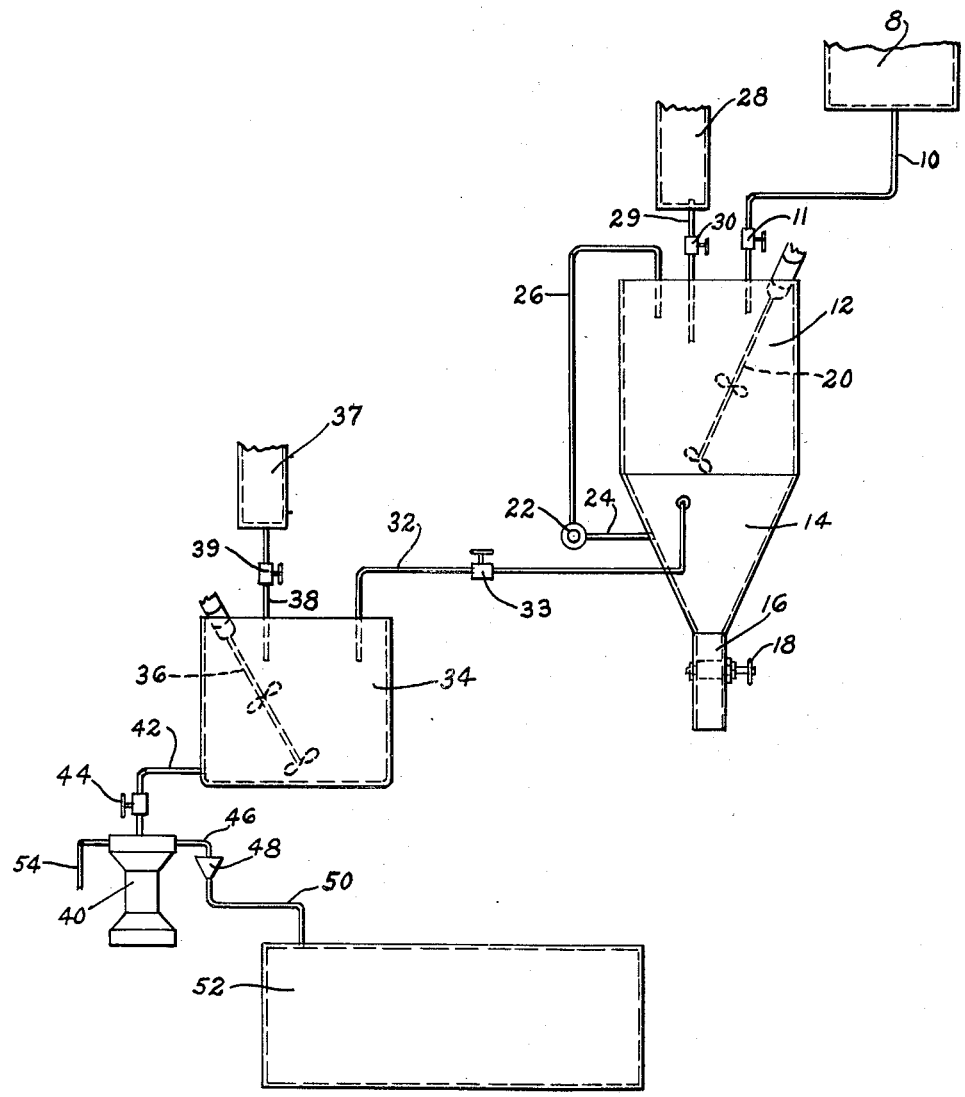
INVENTOR.
Stanton D. Barclay
BY Harold E. Cole
Attorney

United States Patent Office 2,951,031
Patented Aug. 30, 1960

2,951,031

PROCESS FOR PURIFYING OIL WITH MONOISOPROPANOLAMINE

Stanton D. Barclay, Newton, Mass.
(20 Albany St., Cambridge 39, Mass.)

Filed May 7, 1958, Ser. No. 733,514

6 Claims. (Cl. 208—180)

This invention relates to a process for purifying oil, especially used oils such as crank-case oil from motor vehicles, or cutting oils, compressor oils and the like.

One object of my invention is to provide a process of purifying oil, which is simple, inexpensive and efficient, and which will purify the oil so it can be used as a high quality lubricant in an internal combustion engine, or as propulsion fuel therefor.

Another object is to provide such a process that does not require heat or air pressure or water in practicing it.

In well-known processes of purifying crankcase oil, a considerable ash content remains, and when such oil is used as fuel in a diesel engine, incrustation on the injection nozzles occurs, thus interfering with the proper atomization of the fuel. Accordingly, it has been a further object to eliminate substantially all the ash content, thus providing a pure oil that will avoid said incrustation of the injection nozzles and when used as a propulsion fuel. The drawing is a diagrammatic view of apparatus to practice my process.

As illustrated, oil to be purified, such as crankcase oil, passes from a source of supply, such as a tank 8 through a conduit 10 having a valve 11, into a receptacle 12 that preferably has a conical settling base 14 in communication with a sludge and impurities outlet 16 that may be opened and closed by a well known valve 18. Said receptacle 12 is equipped with a stirring or agitating device 20. As shown, a circulating pump 22, and conduits 24 and 26 connected to the lower and upper portions of said receptacle, recirculates the contents of said receptacle 12, which aids in the agitation thereof.

A metering tank 28 has a conduit 29 with a valve 30, connected thereto, which tank is positioned to feed a chemical additive into said receptacle. This additive is a chemical, that forms an electrolyte solution in the oil, which breaks up the colloidal suspensions, causing flocculation and precipitation of the impurities which are chemically bound in the oil. The floc formed, serves to trap other suspended matter and causes the impurities to settle to the bottom of said receptacle as a sludge. An example of such a chemical is hydrochloric acid, and I have found that sulfuric acid is preferable because of its low cost and because of its reaction with dissolved metals in the oil to form insoluble sulfates. It may be 1.84 gravity, for instance. Said acid may constitute one-half of one per cent, by volume, of the crankcase oil, as an example.

The agitation of the oil in said receptacle 12, which may include recirculation as aforesaid, causes gravitational settling out of said impurities in the oil, which settle to the bottom of said receptacle as a sludge. The settling may occur in approximately one hour, for instance.

The oil, which is now semi-purified, is passed out of said receptacle 12 through a conduit 32 having a valve 33 therein, into a container 34 which is equipt with a stirring or agitating device 36. A metering tank 37 contains another additive in the form of an acid reducing chemical, which may be supplied to said container 34 through a conduit 38 having a valve 39. This other additive may be an oil soluble, acid-reducing chemical of the ammonia bearing compounds of the amine type, the latter being known as alkanolamines and should be oil soluble. Triethanolamine is effective for the purpose. I prefer monoisopropanolamine because of satisfactory results and economy. It is preferable about one-quarter of one per cent, by volume, to the oil in said container 34.

The oil and acid-reducing chemical is agitated, thus neutralizing the acids and causing an alkaline reaction. The impurities in this liquid are thus precipitated, so it may be allowed to settle for several hours, whereupon the purified oil may be drawn from the top of the container. This latter operation neutralizes the acids and substantially eliminates the ash therefrom and the resulting impurities in the liquid are separated from the oil.

The impurities will settle by gravitation in approximately six hours, depending upon the quantity of liquid in said container. However, instead of waiting for said impurities in said container to settle, a centrifuge 40 may be connected to said container by means of a conduit 42 having a valve 44. The oil is drawn into said centrifuge and its operation will separate the impurities from the oil in said container, allowing the purified oil to pass through a conduit 46, into a funnel 48 and a conduit 50, and into a storage tank 52, ready for use, either as a lubricant for internal combustion engines, or for use as a propulsion fuel in a diesel engine. Said impurities pass into a discharge conduit 54 from said centrifuge 40.

In my process I have found it desirable, to obtain the desired degree of purification, to use a greater volume of an acid or other material that forms an electrolyte solution, than said acid-reducing chemical later used. Good results are obtained, for instance, by using mineral acids in twice the volume of said acid-reducing chemical.

What I claim is:

1. The process of purifying used crankcase oil that includes acid and ash and from which sludge and some impurities have been removed, comprising placing the oil in a receptacle with about one-quarter of one percent by volume of monoisopropanolamine, agitating the contents at atomspheric temperature until remaining impurities are precipitated, and then separating said remaining impurities from the oil.

2. The process of purifying used crankcase oil that includes acid and ash and from which sludge and some impurities have been removed, comprising placing the oil in a receptacle with about one-quarter of one percent by volume of isopropanolamine, agitating the contents at atmospheric temperature until remaining impurities are precipitated, and then separating said remaining impurities from the oil.

3. The process of purifying used crankcase oil that includes acid and ash and from which sludge and some impurities have been removed, comprising placing the oil in a receptacle with about one-quarter of one percent by volume of monoisopropanolamine, agitating the contents at atmospheric temperature until remaining impurities are precipitated, and then separating said remaining impurities from the oil.

4. The process of purifying used crankcase oil that includes acid and ash and from which sludge and some impurities have been removed, comprising placing the oil in a receptacle with about one-quarter of one percent by volume of isopropanolamine, agitating the contents at atmospheric temperature until remaining impurities are precipitated, and then separating said remaining impurities from the oil.

5. The process of purifying used oil that includes ash, comprising placing the oil in a receptacle with acid that is less than one percent by volume thereof and that forms an electrolyte solution, agitating the mixture at atmospheric temperature until impurities in the oil have settled out, withdrawing the mixture therefrom and placing it in a receptacle with monoisopropanolamine in approximately one-half the volume of said acid, agitating the contents at atmospheric temperature until remaining impurities are precipitated, and then separating said remaining impurities from the oil.

6. The process of purifying used oil that includes ash, comprising placing the oil in a receptacle with acid in a volume of at least one-half of one percent of said oil, and that forms an electrolyte solution, agitating the mixture at atmospheric temperature until impurities in the oil have settled out, withdrawing the mixture therefrom and placing it in a receptacle with a lesser quantity by volume of monoisopropanolamine than said acid and at least one-quarter of one percent of said oil, and agitating the contents at atmospheric temperature therein until remaining impurities are precipitated, and then separating said remaining impurities from said contents.

References Cited in the file of this patent

UNITED STATES PATENTS

| | | |
|---|---|---|
| 1,882,002 | Dietrich | Oct. 11, 1932 |
| 1,990,359 | Ambler | Feb. 5, 1935 |
| 2,030,480 | Strezynski | Feb. 11, 1936 |
| 2,062,733 | Strezynski | Dec. 1, 1936 |
| 2,519,930 | Riethof et al. | Aug. 22, 1950 |
| 2,568,583 | Graves | Sept. 18, 1951 |